United States Patent [19]

Kitaura et al.

[11] Patent Number: 4,963,969
[45] Date of Patent: Oct. 16, 1990

[54] AUTOMATIC GAIN CONTROL DEVICE

[75] Inventors: Hiromu Kitaura, Osakasayama; Mitsuo Isobe, Osaka; Yuichi Ninomiya; Yoshimichi Ohtsuka, both of Kawasaki; Yoshinori Izumi, Tokyo, all of Japan

[73] Assignees: Matsushita Electric Industrial Co., Ltd., Osaka; Nippon Hoso Kyokai, Tokyo, both of Japan

[21] Appl. No.: 314,087

[22] Filed: Feb. 23, 1989

[51] Int. Cl.⁵ .............................................. H04N 5/52
[52] U.S. Cl. .................................... 358/174; 358/153
[58] Field of Search ............... 358/174, 176, 148, 158, 358/153

[56] References Cited

U.S. PATENT DOCUMENTS

| | | | |
|---|---|---|---|
| 3,914,536 | 10/1975 | Mohri | 358/153 |
| 4,707,730 | 11/1987 | Alard | 358/153 |
| 4,769,704 | 9/1988 | Hirai | 358/153 |
| 4,775,890 | 10/1988 | Balaban | 358/153 |
| 4,853,782 | 8/1989 | Asano | 358/148 |
| 4,860,100 | 8/1989 | Rakhodai | 358/148 |

Primary Examiner—Howard W. Britton
Assistant Examiner—Amir Zarabian
Attorney, Agent, or Firm—Stevens, Davis, Miller & Mosher

[57] ABSTRACT

Disclosed is an automatic gain control device which comprises: a first amplitude detection circuit for detecting an average amplitude value of a television video signal, a peak amplitude value of the same television video signal, or a value obtained by mixing the average amplitude value and the peak amplitude value with a predetermined mixing ratio; a second amplitude detection circuit for detecting an amplitude value of a vertical or horizontal synchronizing signal in the television video signal; an amplitude control circuit for controlling an amplitude of an input television video signal; a synchronization circuit for detecting a vertical synchronizing signal and a horizontal synchronizing signal in the television video signal so as to generate various pulses including a clock pulse synchronized with the input television video signal by controlling an oscillation frequency of an oscillation circuit; and a synchronization phase lock detection circuit for detecting whether the synchronization circuit has been pulled into synchronism with the input television video signal, so that the amplitude control circuit is controlled by an output of the second amplitude detection circuit when synchronization phase-lock is established while controlled by an output of the first amplitude detection circuit when the synchronization phase-lock comes out.

5 Claims, 2 Drawing Sheets

AUTOMATIC GAIN CONTROL DEVICE

BACKGROUND OF THE INVENTION

1. Field of the Invention

The present invention relates to an automatic gain control (hereinafter referred to as "AGC") device in a television receiver, particularly in a high definition television receiver for receiving high definition television broadcasting.

2. Description of the Related Art

There has been proposed a band-width compression transmission system for transmitting a high definition video signal for obtaining a more precise picture than that obtainable in the existing standard television system, by use of one channel of 27 MHz band-width of the broadcasting satellite (see Yuichi Ninomiya et al., "High Definition Television Transmitting system through Satellite One-Channel (MUSE)", ITEJ Technical Report, Vol. 7, No. 44, Technical Group on Television Equipment and Broadcast Systems (TEBS), Mar. 22, 1984).

The television system described in the above reference has a feature in that the system is disadvantageous in view of S/N in comparison with the conventional broadcasting system because of its wideband signal and therefore the system is employing a positive polarity synchronizing system in order to prevent S/N from deteriorating as much as possible. The positive polarity synchronizing system will be described by reference to FIGS. 2A and 2B showing waveforms of synchronizing signals. FIG. 2A shows waveforms of vertical synchronizing signals. FIG. 2A shows the vertical synchronizing signals which exist on the 605th and 606th ones of the 1125 scanning lines of the high definition television which provide a frame pulse point 21 once every frame. In FIG. 2A, the numerical values followed by the symbol "CK" represent transmission clock. For example, 1 CK represents a period of 1/(16.2 MHz). The reference numeral 22 represents the period of a horizontal synchronizing signal (hereinafter referred to as "HD period") existing every line, which will be described later. FIG. 2B shows the waveforms of the above-mentioned horizontal synchronizing signal which is inverted in polarity every line. Reference numeral 23 represents a horizontal synchronization reference point (hereinafter referred to as "HD" point) which exists at the 6th one of the transmission clocks represented by the reference numeral 24. Reference numeral 25 represents the level of amplitude which rises and falls within a range of from 25% to 75% as shown in the drawings.

Although not shown in the drawing, the video signal has a time compression color difference signal and a time non-compression luminance signal which exist between the HD period and the HD signal on the next line.

As described above, the television video signal of this television system is of the type of positive polarity synchronizing system in which the vertical synchronizing signal has a 100% amplitude value and the horizontal synchronizing signal has a 50% amplitude value. In a television receiver according to this television system, therefore, it is impossible to perform such a simple synchronizing separation in the direction of amplitude as in the conventional system, and it is necessary to perform the synchronizing separation in a manner so that a frame pulse point is extracted based on the correlation between two lines and then a gate for the horizontal synchronizing signal portion is opened to detect the HD point. Accordingly, a certain time is required by the time the acquisition of synchronism is attained.

As described in detail in the above reference, this television system is a band-width compression system in which one picture scene is composed of pictures of 4 fields and therefore provision of a frame memory is indispensable for demodulation of the picture signal. Accordingly, it is difficult to perform signal processing with respect to the picture signal as it is in the form of an analog signal, and therefore it is necessary to perform an analog-to-digital conversion of the picture signal. To this end, an analog-digital converter (hereinafter referred to as "A/D converter") is used. In this case, however, it is necessary to set the amplitude value of the input analog signal applied to the A/D converter accurately to a 100% level in order to perform accurate signal processing. In the case where there exist various signal sources for satellite broadcasting receivers, VTRs, video discs or the like, variations may occur in signal amplitude, and in order to cope with this problem it is necessary to provide an automatic gain control circuit (hereinafter referred to as "AGC circuit") for controlling the amplitude of the input television video signal with high accuracy.

As described above, the television video signal according to this television system requires highly accurate AGC operation. To this end, it is necessary that the amplitude of the vertical synchronizing signal or horizontal synchronizing signal as defined by referring to FIGS. 2A and 2B is detected and AGC is performed so that the detected amplitude is always kept to a fixed level. Since the television video signal according to this system is of the type of positive polarity synchronization as described above, however, it is impossible to detect the amplitude value of the synchronizing signal in a period before the synchronism is not yet achieved, for example, at the time of power turn-on, to thereby make it impossible to perform AGC in that period. On the other hand, in the case where this television system is used in popular families, a problem arises in that various signal sources may be coupled with input signal terminals so that there exists a possibility that the terminating resistance is made open or double. Taking into consideration not only the above problem but variations in the terminal resistance, it is necessary to absorb the variations of input signal amplitude of about ±10 dB. In the synchronization system according to this television system, however, there is a possibility that the synchronizing signal detection circuit will operate erroneously to make it impossible to perform the acquisition of synchronism. Thus, it is necessary to provide a countermeasure against this problem.

SUMMARY OF THE INVENTION

It is therefore an object of the present invention to solve the problems in the prior art as described above.

In order to attain the above object, the AGC device according to the present invention comprises: first amplitude detection means for detecting an average amplitude value of a television video signal, a peak amplitude value of the same television video signal, or a value obtained by mixing the average amplitude value and the peak amplitude value with a suitable mixing ratio; second amplitude detection means for detecting an amplitude value of a vertical or horizontal synchronizing signal in the television video signal; amplitude control means for controlling an amplitude of an input television video signal; synchronization means for detecting a vertical synchronizing signal and a horizontal synchronizing signal in the television video signal so as to generate various pulses including a clock pulse synchronized with the input television video signal by controlling an oscillation frequency of an internal original oscillation circuit; and synchronization phase lock detection means for detecting whether the synchronization means has been pulled into synchronism with the input television video signal, so that the amplitude control means is controlled by an output of the second amplitude detection means when synchronization phase-lock is established while controlled by an output of the first amplitude detection means when the synchronization phase-lock comes out.

As described above, in the case where accurate amplitude control is required as in this television system in which the television video signal is of the type of positive polarity synchronizing system, the synchronizing signal detection is not simple and the amplitude detection at a synchronizing signal portion can be performed only after the acquisition of synchronism has been established in the individual television receiver per se. In the AGC device according to the present invention, the amplitude of an input television video signal is briefly controlled through detection of the average amplitude thereof and then accurately controlled after the acquisition of synchronism has been established.

BRIEF DESCRIPTION OF THE DRAWINGS

Other features and advantages of the present invention will be apparent from the following description taken in connection with the accompanying drawings, wherein.

DESCRIPTION OF THE PREFERRED EMBODIMENTS

Figure 1:
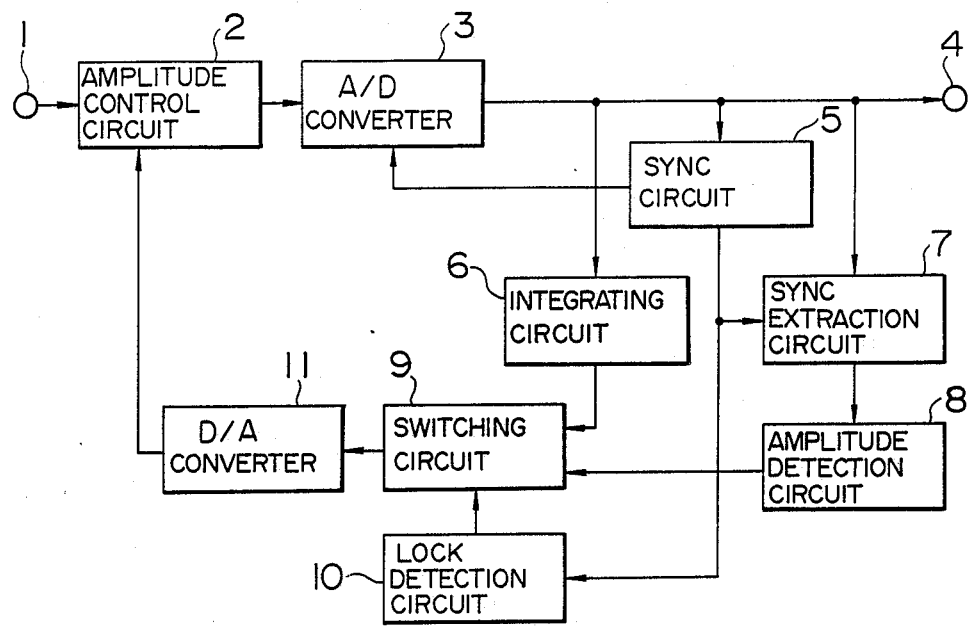
FIG. 1 is a block diagram illustrating a first embodiment of the AGC device according to the present invention.
Figure 2A:
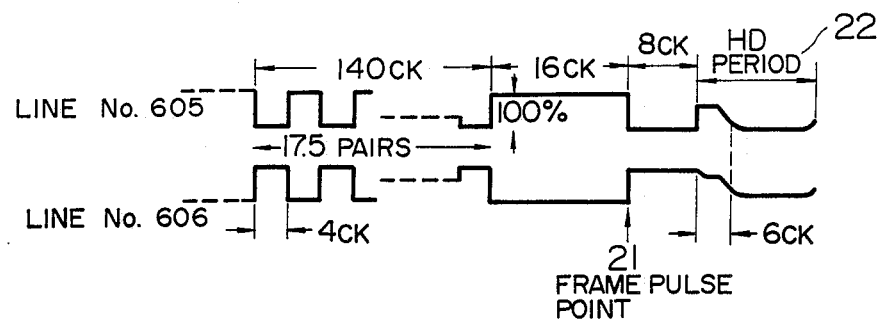
FIGS. 2A and 2B are waveform diagrams illustrating synchronizing signal modes in the AGC device of FIG. 1.
Figure 2B:
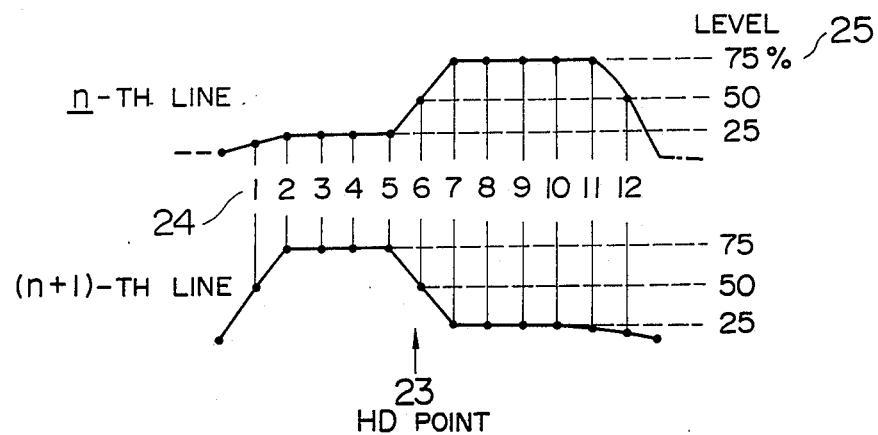

Referring to FIG. 1, an embodiment of the AGC device according to the present invention will be described. A television video signal according to this system is applied to an amplitude control circuit 2 through an input terminal 1. The amplitude control circuit 2 is arranged to control the amplitude of the input television video signal on the basis of an externally applied control signal. The output of the amplitude control circuit 2 is applied as an analog input to an A/D converter 3. The A/D converter 3 converts the analog input signal into a digital signal on the basis of an externally applied clock. The digital output signal of the A/D converter 3 is applied to a digital signal processing circuit in the next stage (not shown) through a digital data output terminal 4. The digital output signal of the A/D converter 3 is applied also to a synchronization circuit 5. The synchronization circuit 5 is arranged to extract vertical and horizontal synchronizing signals out of the television video signal, which is the digital output signal of the A/D converter 3, so as to control the oscillation frequency of a voltage-controlled oscillator, which is an original oscillator, to thereby produce various pulses such as clock pulses synchronized with the input television video signal which are supplied to the A/D converter 3 and other parts described later. The digital output signal of the A/D converter 3 is applied also to an integrating circuit 6 (a first amplitude detection circuit) in which an average amplitude of the television video signal in the form of the digital output signal of the A/D converter 3 is detected and compared with a reference value so as to produce a difference between the average amplitude and the reference value as an output of the integrating circuit 6. In the integrating circuit 6, the time constant for integration, the mixing ratio with which the peak and average values are mixed, etc. are experimentally selected to be optimum. The digital output signal of the A/D converter 3 is applied also to a synchronizing signal extracting circuit 7 which extracts, for example, the 100% rectangular wave synchronizing signal portion of the frame pulse shown in FIG. 2A out of the television video signal in the form of the digital output signal of the A/D converter 3 on the basis of an extraction pulse signal supplied from the synchronization circuit 5. The output of the synchronizing signal extracting circuit 7 is supplied to an amplitude detection circuit 8 (a second amplitude detection circuit) in which the amplitude of the extracted synchronizing signal portion is detected and compared with a reference value so as to produce a difference between the extracted synchronizing signal portion and the reference value as an output of the amplitude detection circuit 8. A switching circuit 9 is arranged to select one of the respective output signals of the integrating circuit 6 and the amplitude detection circuit 8 so as to send out the selected output signal as an AGC signal. Thus, the switching operation of the switching circuit 9 is controlled by a lock detection output signal of a lock detection circuit 10. The lock detection circuit 10 receives the output of the synchronization circuit 5, compares the respective phases of the internal synchronizing signal obtained by dividing the original oscillation frequency and the detected synchronizing signal, and judges that the synchronization phase has been locked when the result of comparison proves that the respective phases of the internal synchronizing signal and the detected synchronizing signal are coincident with each other or the difference between the respective phases falls within a predetermined range so that the lock detection circuit produces the lock detection output signal. In response to the lock detection output, the switching circuit 9 selects the output signal of the integrating circuit 6 in the condition of non-synchronism and selects the output signal of the amplitude detection circuit 8 in a condition where synchronism has been achieved in. A digital-to-analog converter (hereinafter referred to as "D/A converter") 11 converts the digital AGC signal received from the switching circuit 9 into an analog AGC signal and applies the analog AGC signal to the amplitude control circuit 2 so that the amplitude control circuit 2 controls the amplitude of the television video signal to be applied to the A/D converter 3. Each of the parts in the respective blocks per se in FIG. 1 is technically known and therefore the description about the specific construction thereof is omitted here.

According to the AGC operation described above, an average value of the amplitude of the video signal is detected in the condition of out of synchronism, for example, upon power turn-on, upon channel-changeover, or the like, so that the amplitude can be corrected to such an extent that there is no hindrance in detection of synchronizing signal even when the input amplitude fluctuates considerably. Thereafter, if synchronism has been achieved normally, the amplitude is controlled more precisely. Although FIG. 1 illustrates an example wherein the detection of average amplitude and the detection of synchronizing signal amplitude are carried out after the A/D conversion of the television video signal, it is apparent that the same effects can be obtained in the case where the above detections are carried out before the A/D conversion, that is, in the condition where the television video signal is in the form of an analog signal.

Next, a second embodiment of the present invention, which is an application of the first embodiment, will be described. The AGC operation can be performed in a satisfactory way in the case where acquisition of synchronism operation is carried out from the beginning, for example, in power turn-on in channel change-over, or the like, by the AGC operation described with reference to FIG. 1. However, in the stationary state where the AGC operation is carried out by the second amplitude detection means after synchronism has been once achieved, there may occur a case where it becomes impossible to carry out the detection of a synchronizing signal due to drop out or the like, for example, in a reproducing signal of VTR. In such a case, the lock detection circuit detects non-synchronism so that the AGC circuit is changed over to the first amplitude detection means to cause a possibility that the amplitude of the video signal fluctuates, while the synchronization circuit per se does not follow the disturbance because the synchronization circuit has a certain time constant so that the synchronism of a reproduced picture scene is not disturbed. Although being slight, the fluctuation in amplitude of the video signal is undesirable because it is easily detected in a midway of continuous reproduced picture. Accordingly, if the switching circuit for switching the respective outputs of the first and second amplitude detection means is made to have a function such that the switching circuit carries out the switching from the first amplitude detection means side to the second amplitude detection means side immediately in response to the lock detection signal, while after the switching from the first amplitude detection means side to the second amplitude detection means has been once performed, the switching circuit does not immediately respond to the lock detection circuit but carries out the switching operation after a delay with a suitable time constant, the above defects, such as instantaneous disability of synchronism detection, that is, influence of drop-out or the like, can be eliminated. In the period where the synchronizing signal amplitude cannot be detected, there is a possibility that the detected amplitude shows an abnormal value. Accordingly, it is necessary that the value of the detected amplitude immediately before the lock detection circuit indicates the condition of non-synchronism is held so as to be used in that period of disability of synchronizing signal amplitude detection.

Figure 3:
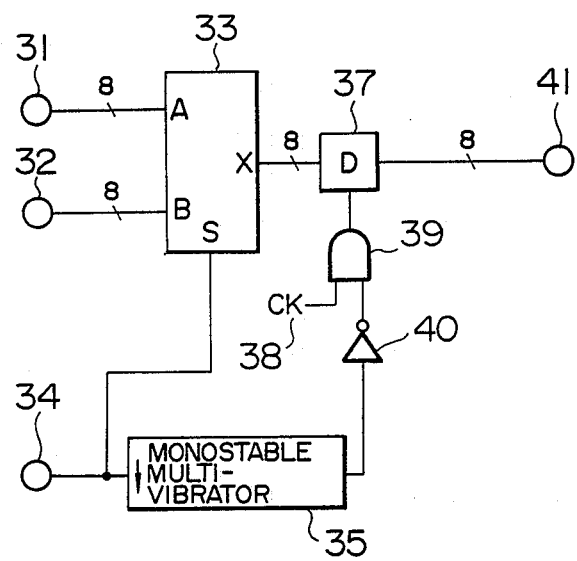
FIG. 3 is a block diagram illustrating a switching circuit for carrying out a second embodiment of the present invention.

FIG. 3 is a block diagram illustrating a specific example of the switching circuit for carrying out the operation of the second embodiment of the present invention. In FIG. 3, reference numerals 31 and 32 represent data input terminals for receiving data from the first and second amplitude detection means respectively. As an example, a switching circuit 33 has two input terminals A and B to which data from the data input terminals 31 and 32 are applied, and a control input terminal S which is connected to a lock detection signal input terminal 34 for receiving the lock detection signal which becomes "1" upon detection of a locked state while becoming "0" when the locked state is not detected. The switching circuit 33 selects the data received by the input terminal A when "0" is applied to the control input terminal S while it selects the data received by the input terminal B when "1" is applied to the control input terminal S. A monostable multivibrator 35 connected to the lock detection signal input terminal 34 is arranged to start its operation at the trailing edge of the lock detection signal applied from the lock detection signal input terminal 34 so that the output of the monostable multivibrator 35 is kept at "1" during the operation thereof while it becomes "0" in the state where the monostable multivibrator 35 does not operate. It is suitable to select the operation time of the monostable multivibrator 35 to be about the period of several frames. A latch circuit 37 connected to the output terminal X of the switching circuit 33 is arranged to shape the output signal of the switching circuit 33 suitably on the basis of the clock pulse signal 38 applied to the latch circuit 37 through an AND circuit 39 for gating the clock signal 38, while the latch circuit 37 holds the preceding data when no clock signal is applied thereto. The AND circuit 39 gates the clock signal 38 in response to a control signal which is the output signal of the monostable multivibrator 35 applied to the AND circuit 39 through an inverter circuit 40. Reference numeral 41 is a data output terminal connected to the output of the latch circuit 37.

The operation of the circuit of FIG. 3 will now be described. In the period before synchronism has been achieved, for example, during power turn-on, "0" is applied to the lock detection signal input terminal 34 so that the data applied to the input terminal A of the switching circuit 33, that is, the data of the first amplitude detection means, is obtained at the output terminal of the switching circuit 33, and this output data is latched in the latch circuit 37 and applied to the next stage through the output terminal 41. After synchronism has been achieved "1" is applied to the lock detection signal input terminal 34, and hence to the control input terminal S of the switching circuit 33, so that the output signal of the second amplitude detection means is put out through the data output terminal 41. In this configuration, in case of occurrence of an instantaneous error in synchronism detection, the lock detection signal applied to the lock detection signal input terminal 34 becomes "0" instantaneously after occurrence of the erroneous synchronism detection. At this time, the monostable multivibrator 35 starts its operation at the trailing edge of the lock detection signal so as to produce "1" at its output for a predetermined period. The output signal "1" of the monostable multivibrator 35 is inverted by the inverter circuit 40 to disable the AND circuit 39 to inhibit the passage of the clock signal 38, so that the latch circuit 37 continues to hold the preceding data, that is, the output data from the second amplitude detection means, in spite of the fact that the output signal of the switching circuit 33 has been switched to the input A side. If the lock detection signal is restored to "1" in the period of operation of the monostable multivibrator 35, the output signal of the first amplitude detection means cannot be produced at the output terminal 41 even instantaneously, so that a reproduced picture of good quality can be obtained.

As a further application of the present invention, it is considered that the amplitude value of the television video signal when the AGC operation is carried out by use of the output signal of the second amplitude detection means, that is, when the non-synchronization exists, is set to a value smaller than that in the period of operation of acquisition of synchronism. This is because it is impossible to perform a clamp in the condition of non-synchronism so that the luminance of the reproduced picture scene may become undesirably abnormally high, and to prevent this phenomenon, therefore, the signal amplitude is made to be small in advance. This idea can be easily realized by multiplying the output signal of the first amplitude detection means by a coefficient which is not smaller than 1 (one).

In a home-use television receiver, various signal sources, such as VTR, video disc, or the like, may often be connected to the receiver in addition to a broadcast signal source. In such a case, the signal amplitude may come out of rating abnormally. There is a possibility that the acquisition of synchronism becomes impossible in the case where complex signal processing is required for synchronization detection, for example, in the case of this television system employing a positive polarity synchronizing signal. According to the present invention, a first AGC operation is carried out within a range where the acquisition of synchronism can be performed and thereafter a second precise AGC operation is carried out. Accordingly, the AGC device according to the present invention is very effective, and is particularly useful for family use and for simple-business use.

We claim:

1. An automatic gain control device for amplitude control of an input television video signal of a type containing a positive polarity synchronizing signal having a vertical synchronizing signal which is formed of a frame pulse shaped in a 100% amplitude rectangular wave, said device comprising:

first amplitude detection means for detecting an average amplitude value and a peak amplitude value of the input television video signal and detecting a further amplitude value equal to that produced by mixing the detected average amplitude value and said peak amplitude value at a pre-determined ratio;

second amplitude detection means for detecting an amplitude value of one of said vertical synchronizing signal and a horizontal synchronizing signal from said input television video signal;

amplitude control means for controlling an amplitude of said input television video signal;

synchronization means, including a controllable oscillator, for detecting said vertical synchronizing signal and said horizontal synchronizing signal from said input television video signal in order to control an oscillation frequency of said oscillator, to generate at least one first-type pulse signal phase-lock synchronized with said input television video signal;

synchronization phase-lock detection means for detecting whether at least one said first-type pulse signal has been generated in phase-lock synchronism with said input television video signal by said synchronization means;

switching means, responsive to said synchronization phase-lock detection means, for enabling control of said amplitude control means responsive to a detection by said phase-lock detection means of a said first-type pulse signal generated in phase-lock synchronization with said input television signal and based on said amplitude value detected by said second amplitude detection means, and for enabling control of said amplitude control means responsive to a detection by said phase-lock detection means of at least one second-type pulse signal generated in non-phase-lock synchronization with said input television video signal and based on said further amplitude value detected by said first amplitude detection means; and amplitude-hold means, responsive to said phase-lock detection means, for responding to a said second-type pulse signal generated after a said first-type pulse signal generated from said synchronization means respectively, in order to hold the amplitude value detected by said second amplitude detection means for a pre-determined time period after a detection by said phase-lock detection means of a second-type pulse signal from the synchronization means.

2. A device as in claim 1, further comprising means for controlling the amplitude control means to cause said amplitude of said input television video signal under control of said further amplitude value detected by said first amplitude detection means to be smaller than said amplitude of said input television video signal under control of said amplitude value detected by said second amplitude detection means.

3. A device as in claim 1, wherein said amplitude holding means comprises a latch circuit which interconnects said switching means and said amplitude control means and which holds said amplitude value detected by said second amplitude detection means for said pre-determined time period.

4. A device as in claim 3, wherein said amplitude holding means further comprises a monostable circuit for instantaneously producing a logical high output pulse for said pre-determined time period in response to an occurrence of a said first-type pulse signal, a gate circuit having an input connected to receive an inverted output of said monostable circuit and an output connected to a control terminal of said latch circuit, a clock circuit providing a clock signal to another input of said gate circuit, said inverted output functioning to disable said gate circuit to inhibit passage of said clock signal to said latch circuit to cause said latch circuit to continue holding said amplitude value detected by said second amplitude detection means for said pre-determined time period in the presence of a said second-type pulse signal occurring during said pre-determined time period instantaneously after said occurrence of said first-type pulse signal.

5. A device as in claim 4, wherein said monostable circuit is a monostable multivibrator and said gate circuit is an AND gate.

* * * * *